(12) United States Patent
Jung et al.

(10) Patent No.: US 11,301,970 B2
(45) Date of Patent: Apr. 12, 2022

(54) IMAGE PROCESSING METHOD AND APPARATUS

(71) Applicants: Samsung Electronics Co., Ltd., Suwon-si (KR); Industry-Academic Cooperation Foundation, Yonsei University, Seoul (KR)

(72) Inventors: Hwiryong Jung, Seoul (KR); Moon Gi Kang, Seoul (KR); Seung Hoon Jee, Seoul (KR); Min Sub Kim, Seoul (KR); Wooshik Kim, Yongin-si (KR); Hyewon Moon, Seongnam-si (KR); Keechang Lee, Seongnam-si (KR); Sunghoon Hong, Hwaseong-si (KR)

(73) Assignees: Samsung Electronics Co., Ltd., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 88 days.

(21) Appl. No.: 16/549,176

(22) Filed: Aug. 23, 2019

(65) Prior Publication Data
US 2020/0349684 A1 Nov. 5, 2020

(30) Foreign Application Priority Data
May 2, 2019 (KR) .................. 10-2019-0051529

(51) Int. Cl.
*G06T 5/00* (2006.01)
*G06T 5/40* (2006.01)
(Continued)

(52) U.S. Cl.
CPC .............. *G06T 5/008* (2013.01); *G06T 5/001* (2013.01); *G06T 5/002* (2013.01); *G06T 5/009* (2013.01);
(Continued)

(58) Field of Classification Search
CPC .......... G06T 5/008; G06T 5/002; G06T 5/40; G06T 5/009; G06T 5/20; G06T 5/50;
(Continued)

(56) References Cited

U.S. PATENT DOCUMENTS 6,040,858 A * 3/2000 Ikeda ................... H04N 5/235
348/242
9,122,954 B2 9/2015 Srebnik et al.
(Continued)

FOREIGN PATENT DOCUMENTS

JP WO 2015/146364 A1 10/2015
JP 5855224 B2 2/2016
(Continued)

OTHER PUBLICATIONS

Li Tao, Vijayan K. Asari, "Adaptive and integrated neighborhood-dependent approach for nonlinear enhancement of color images," J. Electron. Imag. 14(4) 043006 (Oct. 1, 2005), https://doi.org/10.1117/1.2136903. (Year: 2005).*

(Continued)

*Primary Examiner* — Nancy Bitar
*Assistant Examiner* — Daniella M. DiGuglielmo
(74) *Attorney, Agent, or Firm* — NSIP Law

(57) ABSTRACT

An image processing method acquires an image, restores a saturated region in which a pixel in the image has a first reference value based on a first illuminance component of the image, enhances a dark region in which a value of a pixel in the image is less than a second reference value based on the restored saturated region and the first illuminance component, and outputs a dark region-enhanced image.

17 Claims, 12 Drawing Sheets

(51) Int. Cl.
  *G06T 5/20* (2006.01)
  *G06T 5/50* (2006.01)
  *H04N 1/60* (2006.01)
  *H04N 1/407* (2006.01)

(52) U.S. Cl.
  CPC .................. *G06T 5/20* (2013.01); *G06T 5/40* (2013.01); *G06T 5/50* (2013.01); *H04N 1/60* (2013.01); *G06T 5/007* (2013.01); *G06T 2207/10024* (2013.01); *G06T 2207/20021* (2013.01); *G06T 2207/20028* (2013.01); *G06T 2207/20192* (2013.01); *G06T 2207/20208* (2013.01); *G06T 2207/20221* (2013.01); *H04N 1/4072* (2013.01)

(58) Field of Classification Search
  CPC . G06T 2207/20192; G06T 2207/10024; G06T 2207/20021; G06T 2207/20028; G06T 2207/20221; G06T 2207/20208; G06T 5/007; G06T 5/001; H04N 1/4072; H04N 1/60
  USPC .......................................................... 382/162
  See application file for complete search history.

(56) References Cited

U.S. PATENT DOCUMENTS

| | | | |
|---|---|---|---|
| 9,582,866 | B2 | 2/2017 | Shen et al. |
| 2003/0161549 | A1* | 8/2003 | Lei .......................... G06T 5/009 382/274 |
| 2007/0092136 | A1 | 4/2007 | Zhao et al. |
| 2007/0286523 | A1* | 12/2007 | Kim .......................... G06T 5/40 382/274 |
| 2008/0310714 | A1 | 12/2008 | Stern et al. |
| 2012/0275700 | A1 | 11/2012 | Stern et al. |
| 2012/0288192 | A1* | 11/2012 | Heidrich ................. G06T 5/005 382/167 |
| 2014/0146198 | A1* | 5/2014 | Omori ..................... G06T 5/008 348/222.1 |
| 2014/0153820 | A1* | 6/2014 | Lee .......................... G06T 5/007 382/162 |
| 2014/0211048 | A1 | 7/2014 | Kolli |
| 2015/0093028 | A1 | 4/2015 | Srebnik et al. |
| 2016/0267631 | A1* | 9/2016 | Shen ........................ G06T 5/40 |
| 2017/0264831 | A1* | 9/2017 | Hyuga .............. H04N 5/35563 |
| 2017/0332001 | A1 | 11/2017 | Swihart et al. |
| 2018/0035088 | A1* | 2/2018 | Nose .................. H04N 5/23229 |
| 2018/0184024 | A1 | 6/2018 | Colonero et al. |

FOREIGN PATENT DOCUMENTS

| | | |
|---|---|---|
| JP | 2018-26794 A | 2/2018 |
| KR | 10-1633893 B1 | 6/2016 |
| KR | 10-2017-0115880 A | 10/2017 |
| KR | 10-1874538 B1 | 7/2018 |

OTHER PUBLICATIONS

Yanfang Wang, Qian Huang, Jing Hu, "Adaptive enhancement for nonuniform illumination images via nonlinear mapping," J. Electron. Imag. 26(5) 053012 (Sep. 19, 2017) https://doi.org/10.1117/1.JEI.26.5.053012 (Year: 2017).*

Ruta, Andrzej, et al. "In-vehicle Camera Traffic Sign Detection and Recognition." *Machine Vision and Applications*, vol. 22, Issue 2, Mar. 2011 (pp. 359-375).

Song, Ki Sun et al., "Contrast enhancement algorithm considering surrounding information by illumination image." *Journal of Electronic Imaging*, vol. 23, Issue 5, 2014 (pp. 1-19).

Song, Ki Sun et al., "Hue-preserving and saturation-improved color histogram equalization algorithm", *Journal of the Optical Society of America A*, vol. 33, No. 6, Jun. 2016 (pp. 1076-1088).

* cited by examiner

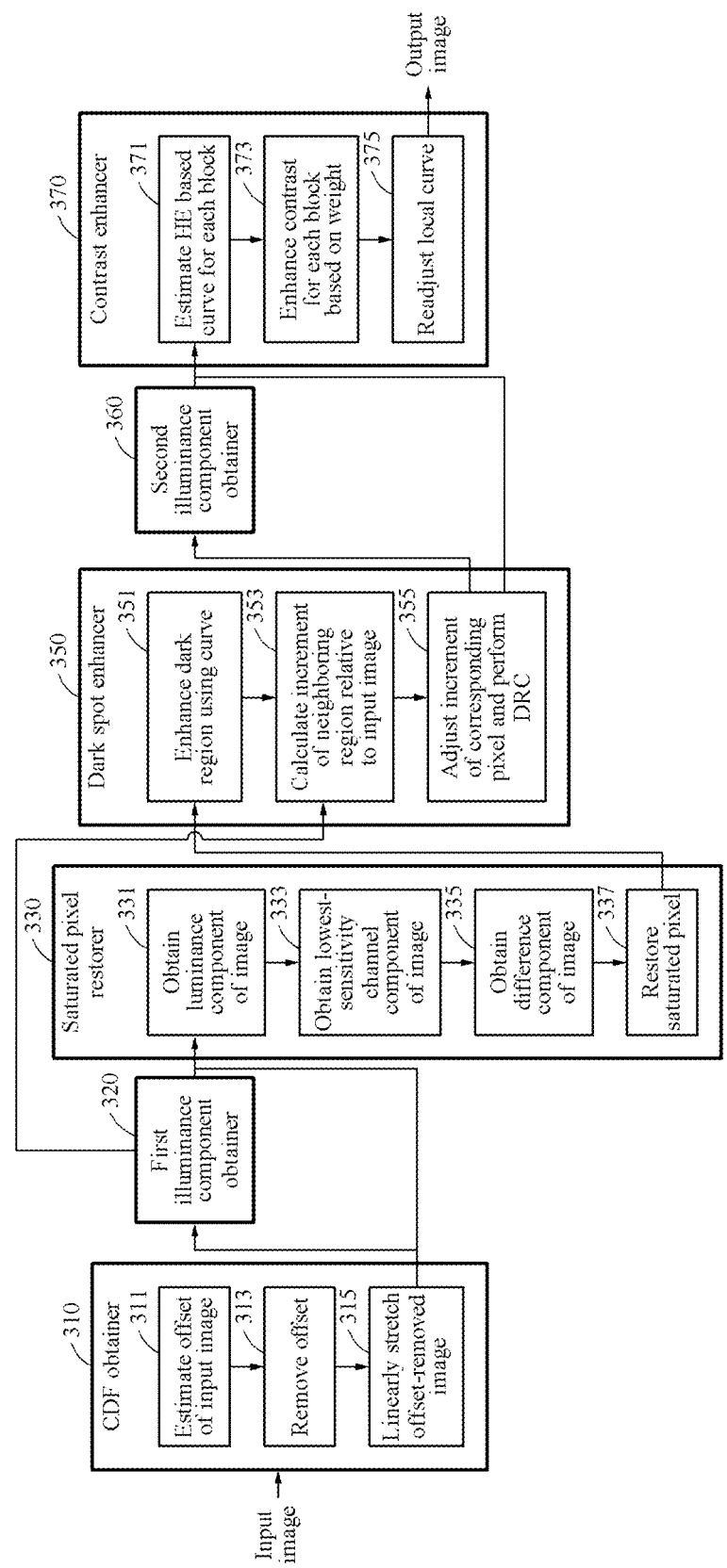

| Index | CDF | CDF int. | OCF | OCF int. |
|---|---|---|---|---|
| 0 | 0 | 0 | 0 | 0 |
| 1 | 0.009381 | 0 | 0 | 0 |
| 2 | 0.020422 | 0 | 0 | 0 |
| 3 | 0.034369 | 0 | 0 | 0 |
| 4 | 0.050807 | 0 | 0 | 0 |
| 5 | 0.071811 | 0 | 0 | 0 |
| 6 | 0.098957 | 0 | 0 | 0 |
| 7 | 0.131251 | 0 | 0 | 0 |
| 8 | 0.167779 | 0 | 0 | 0 |
| 9 | 0.213605 | 0 | 0 | 0 |
| 10 | 0.267899 | 0 | 0 | 0 |
| 11 | 0.332902 | 0 | 0 | 0 |
| 12 | 0.408448 | 0 | 0 | 0 |
| 13 | 0.494621 | 0 | 0 | 0 |
| 14 | 0.601465 | 0 | 0 | 0 |
| 15 | 0.733132 | 0 | 0 | 0 |
| 16 | 0.891696 | 0 | 0 | 0 |
| 17 | 1.084547 | 1 | 1.066946 | 1 |
| 18 | 1.329201 | 1 | 2.133891 | 2 |
| 19 | 1.619681 | 1 | 3.200837 | 3 |
| 20 | 1.984877 | 1 | 4.267782 | 4 |
| 21 | 2.411838 | 2 | 5.334728 | 5 |
| 22 | 2.951953 | 2 | 6.401674 | 6 |
| 23 | 3.578988 | 3 | 7.468619 | 7 |
| 24 | 4.294354 | 4 | 8.535565 | 8 |
| 25 | 5.103385 | 5 | 9.60251 | 9 |
| 26 | 6.028599 | 6 | 10.66946 | 10 |

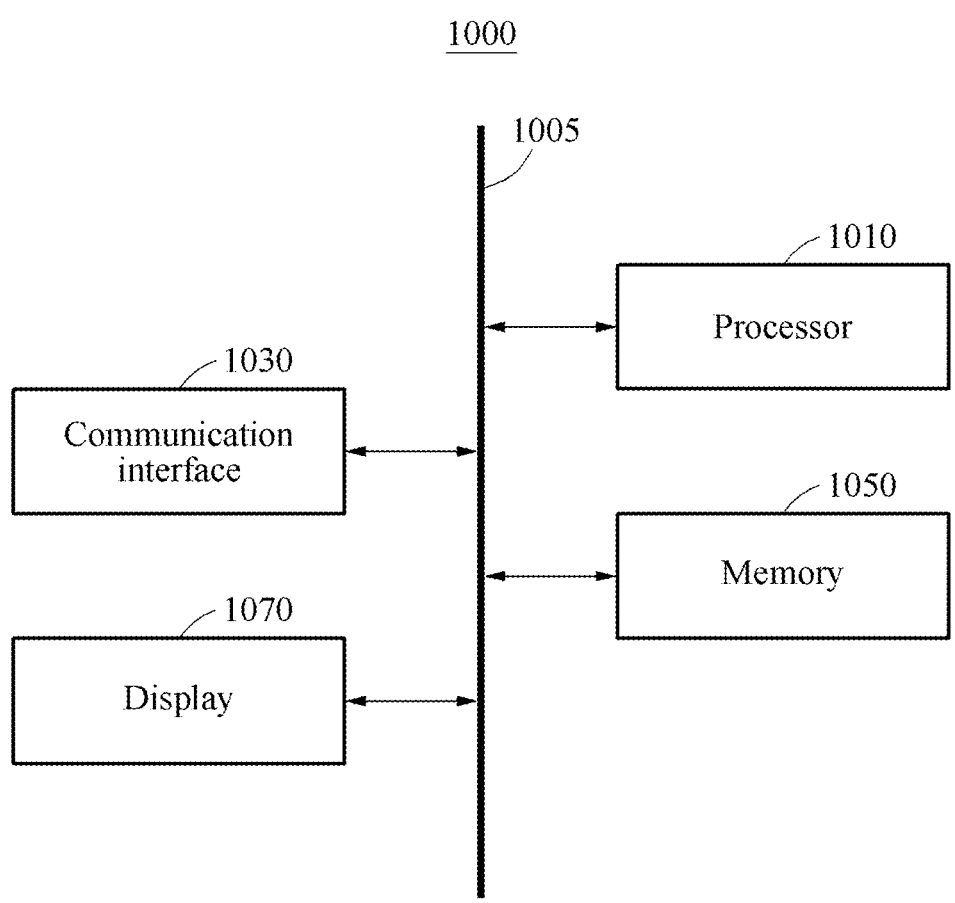

IMAGE PROCESSING METHOD AND APPARATUS

CROSS-REFERENCE TO RELATED APPLICATIONS

This application claims the benefit under 35 USC § 119(a) of Korean Patent Application No. 10-2019-0051529 filed on May 2, 2019 in the Korean Intellectual Property Office, the entire disclosure of which is incorporated herein by reference for all purposes.

BACKGROUND

1. Field

The following description relates to an image processing method and apparatus.

2. Description of Related Art

Pixels in an input image are saturated due to various light sources such as, for example, sun or streetlight, or information of a dark region may be occluded by a neighboring environment, such as, for example, tunnel or tree. Preprocessing method such as, for example, histogram equalization (HE), is used to solve issues due to saturation and occlusion. It is hard to obtain any information from pixels that are already saturated and contain no information. Thus, there is a limitation to restoration of information damaged by natural environment. Further, a high dynamic range (HDR) technique used to prevent the saturation of pixels caused by natural light is a scheme of acquiring a single HDR image from multiple images. Thus, it is impossible to apply HDR in real time to an actual input image of a vehicle, such as a black box image. In addition, if pixels in the image are saturated, it is not easy to enhance a contrast of the image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an image processing method, including acquiring an image, restoring a saturated region in which a first pixel in the image has a first reference value based on a first illuminance component of the image, enhancing a dark region in which a value of a second pixel in the image is less than a second reference value based on the restored saturated region and the first illuminance component, and outputting a dark region-enhanced image.

The restoring may include restoring the saturated region based on a pixel value of a subpixel having a lowest sensitivity among red (R), green (G), and blue (B) subpixels of each of pixels included in the image and the first illuminance component of the image.

The restoring of the saturated region based on the subpixel having the lowest sensitivity and the first illuminance component of the image may include obtaining a luminance component of the image, restoring a luminance component of the saturated region by assuming a linear distribution of the image based on a first illuminance component of the subpixel having the lowest sensitivity and the luminance component, obtaining residual information from an image of the subpixel having the lowest sensitivity and the restored luminance component using a guided filter, and restoring the saturated region by applying the residual information to the luminance component.

The restoring of the luminance component of the saturated region may include restoring the luminance component of the saturated region based on the subpixel having the lowest sensitivity and the first illuminance component of the image, in response to the subpixel having the lowest sensitivity being unsaturated.

The enhancing may include enhancing the dark region based on an over curve, and performing a dynamic range compression (DRC) with respect to a dark region-enhanced image.

The enhancing of the dark region based on the over curve may include enriching the dark region using the over curve, calculating an increment of each of pixel values of a dark region-enriched image relative to each of pixel values of the image, and enhancing the dark region by adjusting the increment of a pixel relative to a neighboring pixel based on the first illuminance component of the image.

The image processing method may include adjusting a contrast of the dark region-enhanced image, wherein the outputting of the dark region-enhanced image may include outputting a contrast-adjusted image.

The adjusting of the contrast may include adjusting a local contrast of the dark region-enhanced image using a histogram equalization (HE) based local curve, and adjusting a global contrast of the dark region-enhanced image by readjusting the local curve based on a second illuminance component extracted from the dark region-enhanced image.

The adjusting of the local contrast may include segmenting the dark region-enhanced image into blocks, estimating the HE based local curve for each of the blocks, and adjusting a contrast for each of the blocks by adjusting the local curve based on a sum of weights corresponding to distances from pixels for each of the blocks to the local curve.

The adjusting of the global contrast may include extracting the second illuminance component from the dark region-enhanced image, and adjusting the global contrast by readjusting the local curve based on the second illuminance component.

The image processing method may include compensating for an offset corresponding to a pixel value less than the second reference value in the image based on a cumulative distribution function (CDF).

The compensating may include setting pixel values of a dark region in which a pixel is estimated to have a value less than the second reference value among values of the pixels included in the image, as the offset and removing the offset, and estimating the CDF by linearly stretching pixels remaining after the offset is removed from the image.

The image processing method may include obtaining the first illuminance component of the image from an offset-compensated image.

The obtaining may include estimating the first illuminance component of the image by passing the offset-compensated image separately through a cross bilateral filter (CBF) based first local filter and a just noticeable difference (JND) based second local filter.

The obtaining may include generating a global blur image corresponding to the image by passing the offset-compensated image through the CBF based first local filter, generating a local blur image corresponding to an edge region of the image by passing the offset-compensated image through the JND based second local filter, and obtaining the first illuminance component by blending the global blur image and the local blur image based on a weight.

In another general aspect, there is provided an image processing apparatus, including a processor configured to restore a saturated region in which a first pixel in an image has a first reference value based on a first illuminance component of the image, and to enhance a dark region in which a value of a second pixel in the image is less than a second reference value based on the restored saturated region and the first illuminance component, and a communication interface configured to acquire the image and to output a dark region-enhanced image.

The processor may be configured to restore the saturated region based on a pixel value of a subpixel having a lowest sensitivity among red (R), green (G), and blue (B) subpixels of each of pixels included in the image and the first illuminance component of the image.

The processor may be configured to obtain a luminance component of the image, restore a luminance component of the saturated region by assuming a linear distribution of the image based on a first illuminance component of the subpixel having the lowest sensitivity and the luminance component, obtain residual information from an image of the subpixel having the lowest sensitivity and the restored luminance component using a guided filter, and restore the saturated region by applying the residual information to the luminance component.

The processor may be configured to enrich the dark region using an over curve, calculate an increment of each of pixel values of a dark region-enhanced image relative to each of pixel values of the image, enhance the dark region by adjusting the increment of a pixel relative to a neighboring pixel based on the first illuminance component of the image, and perform a dynamic range compression (DRC) with respect to the dark region-enhanced image.

In another general aspect, there is provided an image processing apparatus, including a sensor configured to acquire an image, one or more processors comprising a cumulative distribution function (CDF) obtainer configured to set pixel values of a dark region in the image as an offset and to remove the offset from the image, a first illuminance component obtainer configured to estimate a first illuminance component based on the offset-removed image, a saturated pixel restorer configured to restore a saturated region of the offset-removed image in which a pixel has a first reference value based on a pixel value of a subpixel having a lowest sensitivity among red (R), green (G), and blue (B) subpixels of each of pixels in the image and the first illuminance component, a dark spot enhancer configured to enrich a dark region of the saturated region-restored image based on an over curve, determine an increment of each of pixel values of a dark region-enriched image relative to each of pixel values of the image, and to enhance the dark region by adjusting the increment of a pixel relative to a neighboring pixel based on the first illuminance component, a second illuminance component obtainer configured to acquire a second illuminance component from the dark region-enhanced image, and a contrast enhancer configured to adjust a local contrast of the dark region-enhanced image using a histogram equalization (HE) based local curve, and to adjust a global contrast of the dark region-enhanced image by readjusting the local curve based on the second illuminance component, and a display configured to output a dark region-enhanced image.

The cumulative distribution function (CDF) obtainer may be configured to linearly stretch pixels remaining after the offset is removed from the image.

The dark spot enhancer may be configured to perform a dynamic range compression (DRC) with respect to the dark region-enhanced image.

The dark spot enhancer may be configured to segment the dark region-enhanced image into blocks, to estimate the HE based local curve for each of the blocks, and to adjust a contrast for each of the blocks by adjusting the local curve based on a sum of weights corresponding to distances from pixels for each of the blocks to the local curve.

Other features and aspects will be apparent from the following detailed description, the drawings, and the claims.

BRIEF DESCRIPTION OF THE DRAWINGS

FIG. 3 illustrates an example of an image processing method.

FIGS. 4A and 4B illustrate an example of an offset compensation function (OCF) corrected based on a cumulative distribution function (CDF) estimation.

FIG. 10 illustrates an example of an image processing apparatus.

Figure 1:
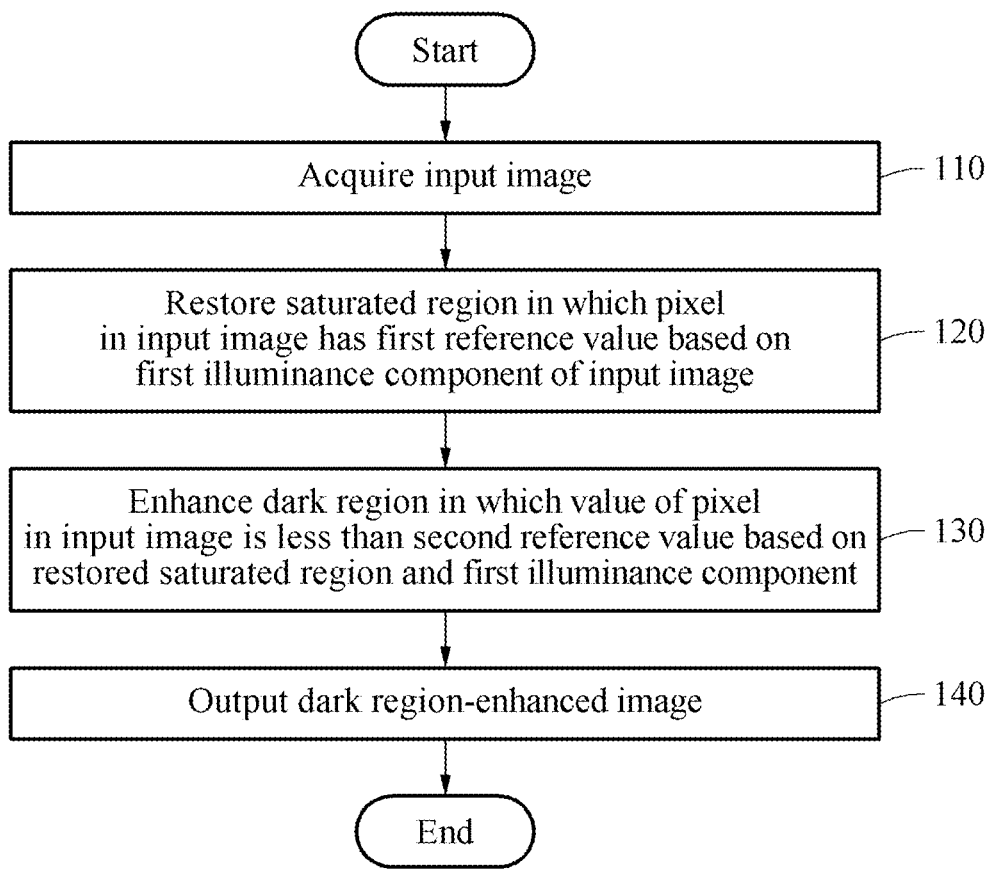
FIG. 1 illustrates an example of an image processing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

When a part is connected to another part, it includes not only a case where the part is directly connected but also a case where the part is connected with another part in between. Also, when a part includes a constituent element, other elements may also be included in the part, instead of the other elements being excluded, unless specifically stated otherwise. Although terms such as "first," "second," "third" "A," "B," (a), and (b) may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

It should be noted that if it is described that one component is "connected", "coupled", or "joined" to another component, a third component may be "connected", "coupled", and "joined" between the first and second components, although the first component may be directly connected, coupled, or joined to the second component. However, if the specification states that a first component is "directly connected" or "directly joined" to a second component, a third component may not be "connected" or "joined" between the first component and the second component. Similar expressions, for example, "between" and "Immediately between" and "adjacent to" and "immediately adjacent to," are also to be construed in this manner.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The use of the term 'may' herein with respect to an example or embodiment, e.g., as to what an example or embodiment may include or implement, means that at least one example or embodiment exists where such a feature is included or implemented while all examples and embodiments are not limited thereto.

FIG. 1 illustrates an example of an image processing method. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by a special purpose hardware-based computer, such as a processor, that performs the specified functions, or combinations of special purpose hardware and computer instructions.

Referring to FIG. 1, in operation 110, an image processing apparatus acquires an input image. The input image is, for example, a single image. The input image is, for example, a driving image acquired through a capturing device mounted on a vehicle to capture a front view or both side views of the vehicle while the vehicle is travelling. In another example, the input image is an external image of any one or any combination of the front view and the side views of the vehicle received from an outside of the image processing apparatus through a communication interface, such as, for example, communication interface 1030 of FIG. 10.

The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, a smart mobility device, an intelligent vehicle with an advanced driver assistance system (ADAS), or a drone. In an example, the smart mobility device includes mobility devices such as, for example, electric wheels, electric kickboard, electric scooter, and electric bike. In an example, vehicles include motorized and non-motorized vehicles, for example, a vehicle with a power engine (for example, a cultivator or a motorcycle), a bicycle or a handcart.

In addition to the vehicle described herein, methods and apparatuses described herein may be included in various other devices, such as, for example, a smart phone, a walking assistance device, a wearable device, a security device, a robot, a mobile terminal, and various Internet of Things (IoT) devices.

In an example, the methods and apparatuses described herein are used to enhances the recognition performance of driving images to improve road guidance information in a navigation device of a vehicle, such as, for example, an augmented reality head-up display (AR 3D HUD), and an autonomous vehicle. The examples set forth hereinafter may be utilized to display lines n an AR navigation system of a smart vehicle, generate visual information to assist steering of an autonomous vehicle, or provide a variety of control information related to driving of a vehicle. Further, the examples are used to assist safe and pleasant driving by providing enhanced visual information to a device including an intelligent system, such as a HUD installed on a vehicle for driving assistance or fully autonomous driving. In an example, the examples described herein may also be used to interpret visual information for an intelligent system installed for fully autonomous driving or driving assistance in a vehicle and used to assist safe and comfortable driving. The examples described herein may be applicable to vehicles and vehicle management systems such as, for example, an autonomous vehicle, an automatic or autonomous driving system, an intelligent vehicle, an advanced driver assistance system (ADAS), a navigation system to assist a vehicle with safely maintaining a lane on which the vehicle is travelling, a smartphone, or a mobile device. The examples related to displaying a road guidance information for vehicles is provided as an example only, and other examples such as, for example, training, gaming, applications in healthcare, public safety, tourism, and marketing are considered to be well within the scope of the present disclosure.

In operation 120, the image processing apparatus restores a saturated region in which a pixel in the input image has a first reference value, for example, "255", based on a first illuminance component of the input image. The "saturated region" is a region including saturated pixels. For example, the image processing apparatus restores the saturated region by applying a high dynamic range (HDR) technique based on a pixel value of a subpixel having a lowest sensitivity among red (R), green (G), and blue (B) subpixels of each of pixels included in the input image and the first illuminance component of the input image. The "HDR technique" corresponds to a technology which provides a detailed analysis of a wide range of contrast, such as a real scenery viewed with human eyes. Here, the wide range is also referred to as a "dynamic range". The HDR technique expresses a variety of luminance existing in reality by increasing a contrast ratio of an image so as to make a bright portion brighter and a dark portion darker in a digital image, thereby broadening a range of luminance to be similar to what is really viewed with human eyes. The contrast ratio of the image is construed as a difference between a brightest portion and a darkest portion in the image. An example in which the image processing apparatus obtains the first illuminance component of the input image will be described further below with reference to FIG. 5.

The image processing apparatus obtains a difference component of the input image based on a pixel value of a subpixel having a lowest sensitivity, for example, the B subpixel, among the R, G, and B subpixels of each of the pixels included in the input image and the first illuminance component of the input image. In an example, the image processing apparatus restores the saturated region by assuming a linear distribution of the input image based on the difference component. In an example, the "R, G, and B subpixeis" are also referred to as "R, G, and B channels". An example in which the image processing apparatus restores the saturated region will be described further below with reference to FIGS. 6 through 7B.

In operation 130, the image processing apparatus enhances a dark region in which a value of a pixel in the input image is less than a second reference value based on the restored saturated region and the first illuminance component. In an example the image processing apparatus enhances the dark region based on an over curve. For example, the image processing apparatus enhances the dark region using the over curve. Further, the image processing apparatus performs a dynamic range compression (DRC) with respect to a dark region-enhanced image. An example in which the image processing apparatus enhances the dark region will be described further below with reference to FIGS. 8A and 8B.

In operation 140, the image processing apparatus outputs the dark region-enhanced image.

Figure 2:
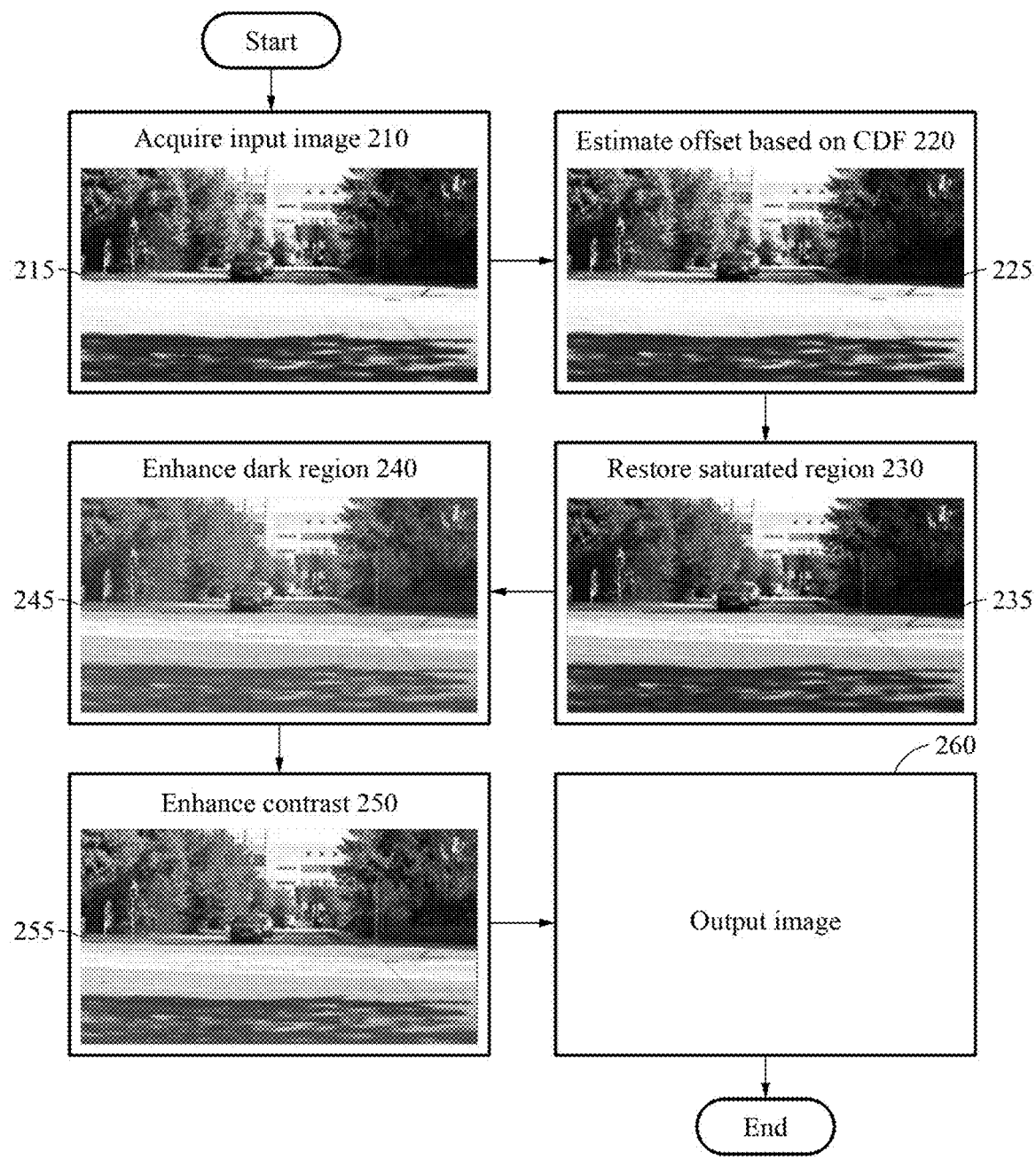
FIG. 2 illustrates an example of an image processing method.

FIG. 2 illustrates an example of an image processing method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by a special purpose hardware-based computer, such as a processor, that performs the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

An image processing apparatus is an apparatus that processes an input image to have enhanced information. The image processing apparatus restores a saturated region or a saturated pixel in the input image and enhances a dark region and a contrast of the image, thereby enhancing information of the input image.

Referring to FIG. 2, in operation 210, the image processing apparatus acquires an input image 215. The input image is, for example, a driving image captured using a single sensor.

In operation 220, the image processing apparatus estimates an offset based on a cumulative distribution function (CDF) with respect to the input image 215. In an example, the image processing apparatus prevents compression of a bright region when there are a number of dark regions in the input image through an offset estimation. As a result of the offset estimation, the dark region is expressed to be somewhat brighter in image 225, when compared to the input image 215.

In operation 230, the image processing apparatus restores a saturated region in the image 225. For example, the image processing apparatus restores the saturated region as shown in an image 235 by restoring a saturated pixel value based on an HDR using a B subpixel or a channel unsaturated since it has a lowest sensitivity in the input image. A center line region saturated in the input image 215 is restored in the image 235.

In operation 240, the image processing apparatus enhances a dark region of the saturated region-restored image 235, as shown in an image 245. Information of the dark region in the shadow of trees, which is hardly identified in the input image 215, is well identified in the image 245.

In operation 250, the image processing apparatus enhances an overall contrast of the dark region-enhanced image 245, as shown in an image 255. For example, the image processing apparatus enhances the overall contrast, as shown in the image 255, by adjusting a local contrast and a global contrast of the dark region-enhanced image 245.

Data of a digital image is divided by pixels, and thus is changed by calculating a value of an image density. In operation 250, when the contrast of the image is low, the image processing apparatus enhances the contrast by increasing an overall density, for example, a value of a bright pixel is decreased and a value of a dark pixel is increased.

In operation 260, the image processing apparatus outputs the overall contrast-enhanced image 255 acquired through operation 250. Information of a bush and a pole on a road, which is saturated and invisible in the input image 215, is enhanced in the image 255. Further, information of a shadow region of a left forest in the input image 215 is also enhanced in the image 255 through the enhancement of the dark region and the enhancement of the contrast.

For example, when a light source changes in a driving image, pixels of a sensor may be saturated while an exposure of a camera measures a variation in the light source and changes an exposure level. When such a saturated region corresponds to a marking or a sign, an error may occur in a feature recognition of the marking and a road due to the saturated pixel.

Such a phenomenon also occurs in an image including a shadow region. For example, when a region of interest such as a marking or a sign is occluded by a dark region such as a shadow, a recognition of the corresponding region is not performed properly.

In an example, through the image processing process described above, a loss of information caused by, for example, a shadow, a deterioration such as a backlight, or a tunnel is compensated for. When the information is enhanced through the compensation, a recognition of objects of interest such as a vehicle and a road is performed more smoothly.

FIG. 3 illustrates an example of an image processing method. Referring to FIG. 3, a configuration and an operation of an image processing apparatus 300 are illustrated.

The image processing apparatus 300 includes a CDF obtainer 310, a first illuminance component obtainer 320, a saturated pixel restorer 330, a dark spot enhancer 350, a second illuminance component obtainer 360, and a contrast enhancer 370.

Each of the image processing apparatus 300, the CDF obtainer 310, the first illuminance component obtainer 320, the saturated pixel restorer 330, the dark spot enhancer 350, the second illuminance component obtainer 360, the contrast enhancer 370 may be implemented on one or more processors. The processor refers to a data processing device configured as hardware with a circuitry in a physical structure to execute desired operations. For example, the desired operations may include codes or instructions included in a program. For example, the data processing device configured as hardware may include a microprocessor, a central processing unit (CPU), a processor core, a multicore processor, a reconfigurable processor, a multiprocessor, an application-specific integrated circuit (ASIC), a field programmable gate array (FPGA), a graphics processor unit (GPU), or any other type of multi- or single-processor configuration. In an example, the processor executes functions and instructions in the image processing apparatus 300. For example, the processor may process instructions stored in a memory. Further details regarding the process is provided below. Each element the CDF obtainer 310, the first illuminance component obtainer 320, the saturated pixel restorer 330, the dark spot enhancer 350, the second illuminance component obtainer 360, the contrast enhancer 370 of the image processing apparatus 300 may be replaced with another device or module which performs the same operation, and thus examples are not necessarily limited to the elements Illustrated in FIG. 3.

The CDF obtainer 310 compensates for an offset corresponding to a pixel value less than a second reference value in an input image based on a CDF. Here, the "offset" corresponds to pixel values of a dark region in which a pixel is estimated to have a value less than the second reference value, for example, "1", among values of pixels included in the input image.

In operation 311, when the input image is acquired, the CDF obtainer 310 estimates an offset of the input image. In operation 313, the CDF obtainer 310 removes the estimated offset. In an example, the CDF obtainer 310 sets pixel values of a dark region among values of the pixels included in the input image, as the offset and removes the offset.

In operation 315, the CDF obtainer 310 obtains the CDF by estimating the CDF by linearly stretching pixels remaining after the offset is removed from the input image. The CDF obtainer 310 overcomes a quantization error through the linear stretching.

An example in which the CDF obtainer 310 obtains the CDF by compensating for the offset will be described further below with reference to FIGS. 4A and 4B.

The first illuminance component obtainer 320 estimates a first illuminance component of the input image from an offset-compensated image acquired through the CDF obtainer 310, i.e., an offset-removed image. In an example, the first illuminance component obtainer 320 estimates the first illuminance component of the input image by passing the offset-compensated input image separately through a cross bilateral filter (CBF) based first local filter and a just noticeable difference (JND) based second local filter. An example in which the first illuminance component obtainer 320 estimates the first illuminance component will be described further below with reference to FIG. 5.

In operation 331, the saturated pixel restorer 330 obtains a luminance component of the input image. In operation 333, the saturated pixel restorer 330 obtains a pixel value of a subpixel having a lowest sensitivity among R, G, and B subpixels of each of the pixels included in the input image, that is, a lowest-sensitivity channel component. In operation 335, the saturated pixel restorer 330 obtains a difference component of the input image based on the luminance component of the input image and the lowest-sensitivity channel component. In an example, in operation 337, the saturated pixel restorer 330 restores a saturated pixel by assuming a linear distribution characteristic of the input image based on the obtained difference component. An example in which the saturated pixel restorer 330 restores the saturated pixel will be described further below with reference to FIGS. 6 through 7B.

In operation 351, the dark spot enhancer 350 enhances a dark region of a saturated pixel-restored image using the restored saturated pixel and a curve, for example, an over curve. Here, the dark region is also referred to as a "dark spot". In operation 353, the dark spot enhancer 350 calculates an increment of each of pixel values of a dark region-enhanced image relative to pixel values of the input image. In an example, the dark spot enhancer 350 adjusts the increment of the pixel relative to a neighboring pixel based on the first illuminance component of the input image acquired by the first illuminance component obtainer 320. In operation 355, the dark spot enhancer 350 performs a DRC with respect to the dark region-enhanced image. An example in which the dark spot enhancer 350 enhances the dark region of the saturated pixel-restored image will be described further below with reference to FIGS. 8A and 8B.

Since the dark spot enhancer 350 and the contrast enhancer 370 of the image processing apparatus 300 process the luminance component of the image, a process of changing a color domain may be needed. To enhance the contrast of the dark region-enhanced image acquired through the dark spot enhancer 350, a second illuminance component is obtained from the dark region-enhanced image by the second illuminance component obtainer 360. The second illuminance component is used by the contrast enhancer 370 to readjust a local curve. In an example, "readjusting the local curve" is adjusting luminances of contrast-adjusted blocks.

The contrast enhancer 370 adjusts a contrast of the dark region-enhanced image. The contrast enhancer 370 enhances the contrast of the dark region-enhanced image using the dark region-enhanced image acquired through the dark spot enhancer 350 and the second illuminance component obtained from the dark region-enhanced image.

The contrast enhancer 370 adjusts a local contrast of the dark region-enhanced image, for example, using a histogram equalization (HE) based local curve. In an example, the "HE" is a method of redistributing a brightness value on a histogram having a uniform distribution, to enhance a quality of image by processing an image having a narrow range of brightness distribution to have a wide range of brightness distribution. The HE redistributes brightness values in a proportion of the total number of pixels of the image to a cumulative distribution, and is used to accurately represent details in a dark region. In an example, the contrast enhancer 370 generates a histogram with respect to the dark region-enhanced image, and changes the histogram to a cumulative form. The contrast enhancer 370 changes a luminance value to an ideal luminance distribution in the histogram of the cumulative form.

In operation 371, the contrast enhancer 370 segments the dark region-enhanced image into multiple blocks, and estimates an HE based local curve for each of the blocks.

In operation 373, the contrast enhancer 370 enhances a contrast of a pixel for each of the blocks based on a weight with respect to a neighboring block for the local curve. The contrast enhancer 370 adjusts the contrast for each of the blocks by adjusting the local curve based on a sum of weights corresponding to distances from pixels for each of the blocks to the local curve.

In operation 375, the contrast enhancer 370 adjusts a global contrast of the dark region-enhanced image while maintaining an average local brightness by readjusting the local curve based on the second illuminance component extracted from the dark region-enhanced image. An example in which the contrast enhancer 370 enhances the contrast of the dark region-enhanced image will be described further below with reference to FIG. 9.

In an example, the image processing apparatus 300 outputs a contrast-enhanced image through the process described above.

Figure 4B:
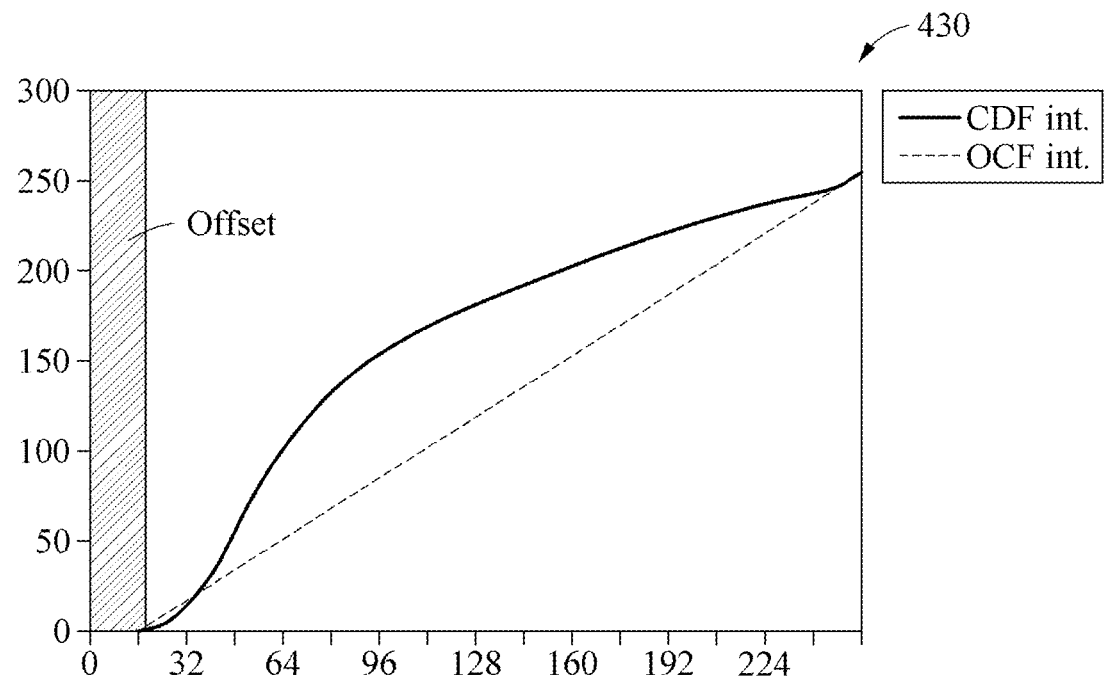

FIGS. 4A and 4B illustrate an example of an offset compensation function (OCF) corrected based on a CDF estimation. FIG. 4A illustrates an example of—a table 410 showing causes of compression of a dark region of an input image, and FIG. 4B illustrates an example of a graph 430 showing a result of solving the issue of compression of the dark region.

For example, when an HE is used to estimate an offset of an image using a CDF, an image processing apparatus estimates an offset through a pixel value mapped to an adaptive curve during the HE process. The image processing apparatus determines pixel information newly mapped to "0" at a CDF int of the table 410 to be the offset by applying an inverse function of the CDF. In this process, pixel values estimated to be less than "1" in the CDF are all mapped to "0", and thus the compression of the dark region occurs.

In an example, to solve the issue of compression of the dark region, the pixel values estimated to be less than "1", for example, pixel values with indices from "0" to "16" in the table 410, are set as an offset, and the pixels set as the offset are removed. Through this, the image processing apparatus eliminates an effect of the pixels set as the offset on the CDF estimation. When the CDF is estimated after the offset is removed as described above, occurrence of compression of dark regions, for example, dark regions estimated to be "1" due to the pixels set as the offset, is relatively suppressed. Through the process described above, a dynamic range (DR) reduction resulting from use of a histogram based method is suppressed.

The graph 430 is a graph of an OCF corrected after the CDF estimation described above. In the graph 430, an axis X indicates a total number of pixels, and an axis Y indicates a number of pixels having a predetermined luminance. In an example, it is assumed that the input image is an 8-bit image. In the graph 430, an OCF int corresponds to a result of linearly stretching pixels remaining after the offset is removed at the CDF int.

When the image processing apparatus processes the offset as shown in the table 410, the number of pixel values mapped to "1" decreases as shown in the graph 430, and thus the phenomenon of compression of the dark region decreases. An offset-compensated input image acquired through the above process is transmitted to, for example, a first illuminance component obtainer (refer to the first illuminance component obtainer 320 of FIG. 3). An illuminance component, for example, a first illuminance component, of the offset-compensated input image is used later to prevent a halo artifact occurring during image Splicing.

Figure 5:
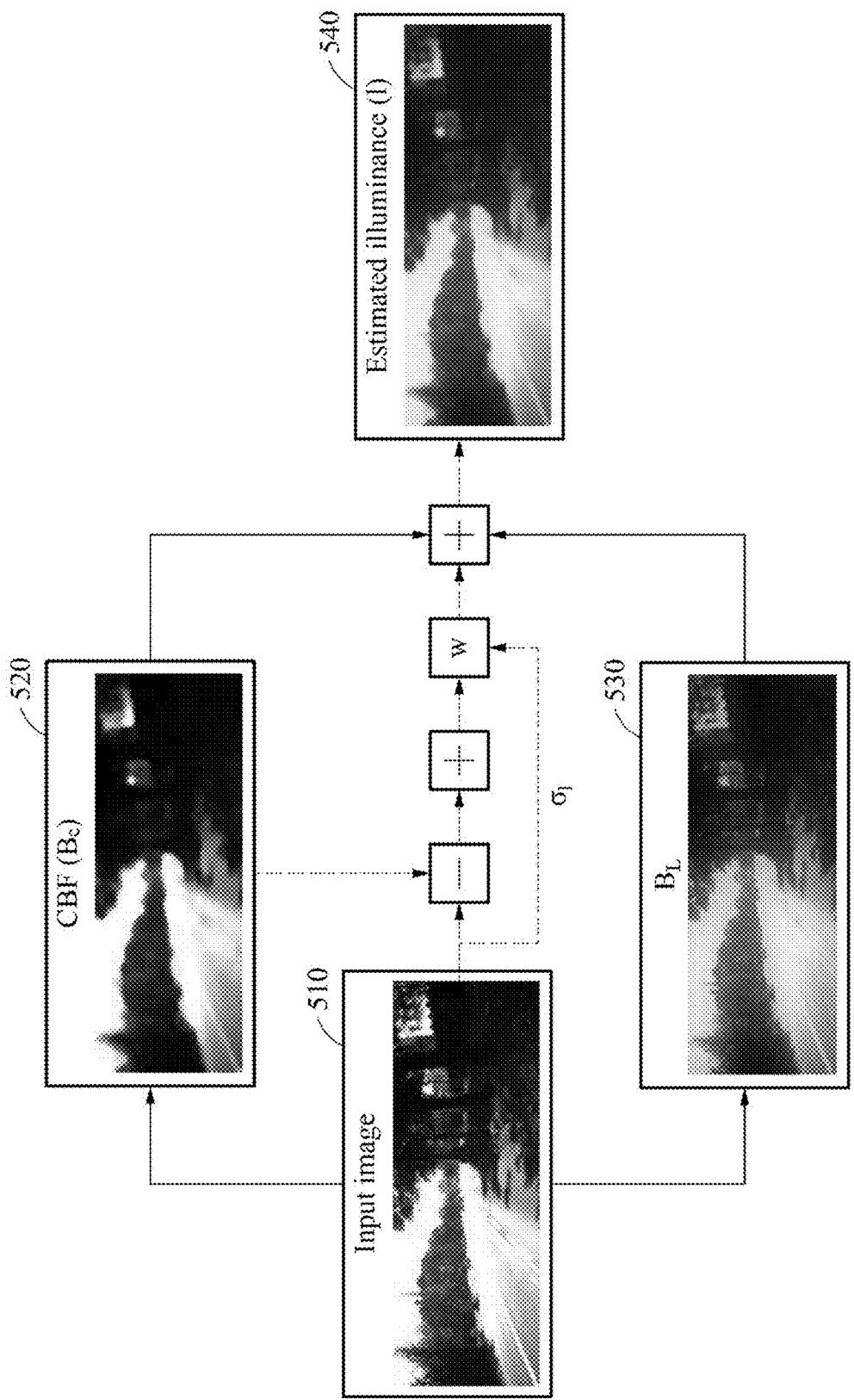
FIG. 5 illustrates an example of estimating illuminance information.

FIG. 5 illustrates an example of estimating illuminance information. Referring to FIG. 5, an image processing apparatus generates a global blur image 520 corresponding to an input image 510 bypassing the input image 510 through a CBF based first local filter. The input image 510 is the offset-compensated input image acquired through the process described with reference to FIGS. 4A and 4B.

In an example, the image processing apparatus generates a local blur image 530 corresponding to an edge region of the input image 510 by passing the input image 510 through a JND based second local filter.

The image processing apparatus obtains a first illuminance component 540 by blending the global blur image 520 and the local blur image 530 based on a weight.

The image processing apparatus passes the input image 510 through the CBF based first local filter to implement a low-frequency characteristic of an illuminance component of an image. However, when only a low-frequency component of an image is estimated with respect to the corresponding image, a halo artifact of an edge being inverted at an edge portion of an object may occur. In an example, the halo artifact is prevented by blending the global blur image 520 with information related to the edge portion of the image acquired using the JND based second local filter. The first illuminance component 540 obtained through the process described above is used later for a process of restoring a saturated pixel and a process of enhancing a dark region.

In an example, the above process of obtaining the first illuminance component 540 is expressed by Equation 1.

$$l=(1-w)B_g+wB_L$$

$$w=\sigma_I+|B_gI(x,y)-I(x,y)| \qquad \text{[Equation 1]}$$

In Equation 1, 1 denotes the estimated first illuminance component 540, and B denotes the global blur image 520 blurred using the CBF. $B_L$ denotes the local blur image 530 blurred using the JND. w denotes a weight, and $\sigma_I$ denotes an input standard deviation.

In an example, the image processing apparatus determines one of the two blurred images to which a greater weight is to be assigned by determining whether a pixel in the input image 410 corresponds to a flat region or an edge region.

Figure 6:
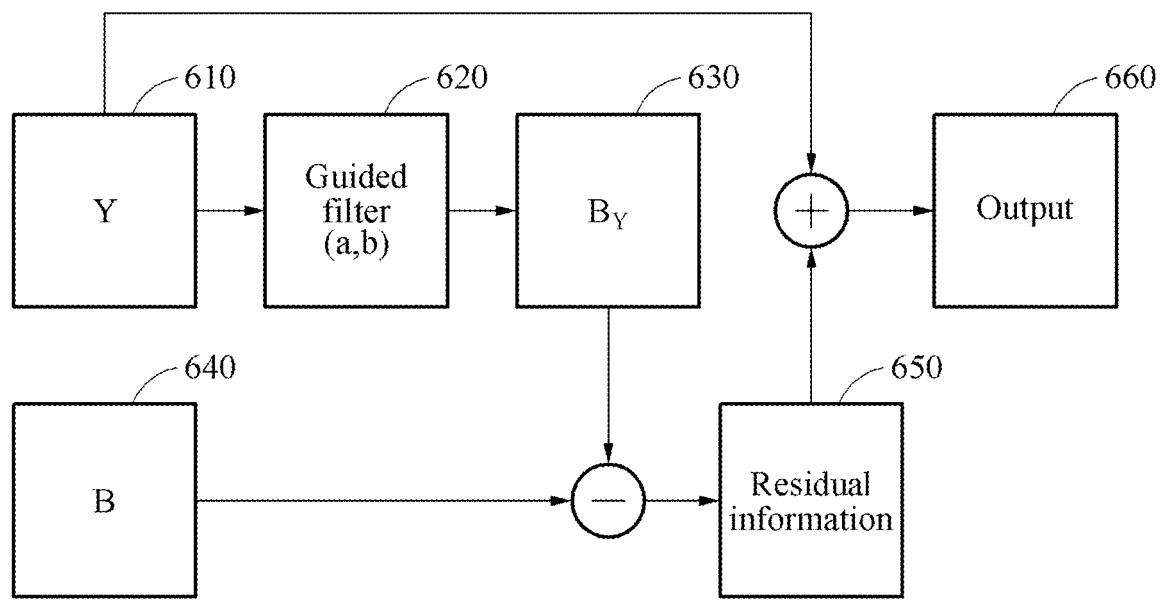
FIG. 6 illustrates an example of restoring a saturated region.

FIG. 6 illustrates an example of restoring a saturated region. Referring to FIG. 6, a luminance component Y 610 of an input image, a guided filter 620, a luminance component-restored image By 630 acquired by the guided filter 620, an illuminance component 640 of a subpixel B having a lowest sensitivity, residual information 650, and a saturated region-restored image 660 are illustrated. Here, the luminance component-restored image By 630 corresponds to an image in which the subpixel B is smoothed by the guided filter 620.

In an example, an image processing apparatus restores a luminance component of a saturated region by assuming a linear distribution of an input image based on the illuminance component 640 of the subpixel having the lowest sensitivity and the luminance component 610. In this example, the image processing apparatus verifies whether the subpixel B having the lowest sensitivity, among three channels R, G, and B, is saturated. If the subpixel having the lowest sensitivity is saturated, there is no reference value for saturation restoration with respect to the corresponding image, and thus it is not possible to restore a corresponding pixel. However, if the subpixel having the lowest sensitivity is unsaturated, it is possible to restore the saturated region using the corresponding subpixel.

If the subpixel B having the lowest sensitivity is unsaturated, the image processing apparatus restores a luminance component of the saturated region based on the luminance component 610 of the input image and the illuminance component 640 of the subpixel having the lowest sensitivity.

In an example, the image processing apparatus obtains the luminance component 610 of the input image. The image processing apparatus restores a saturated luminance component by assuming a linear distribution of the input image based on the luminance component 610 of the input image and the illuminance component 640 of the channel having the lowest sensitivity. The image processing apparatus obtains the luminance component-restored image 630 by applying the guided filter 620 to the luminance component 610 of the input image, and obtains the residual information 650 from the illuminance component 640 of the subpixel having the lowest sensitivity and the luminance component-restored image 630.

The image processing apparatus generates the saturated region-restored image 660 by applying the residual information 650 to the luminance component 610 of the input image. In an example, the saturated region-restored image 660 having a high correlation with a neighboring region is acquired based on the residual information 650. In FIG. 6, for example, if the input image is an 8-bit image, the residual information 650 is 10-bit information. As a result, the saturated region-restored image 660 is a 10-bit image. In an example, a saturated pixel value is restored by assuming arbitrary bits higher than the input image. Thus, an actual DR is widened. However, the saturated region-restored image 660 appears dark. Here, the DR widened to 10 bits is compressed again to 8 bits through a DRC process which will be described below with reference to FIGS. 8A and 8B.

Figure 7A:
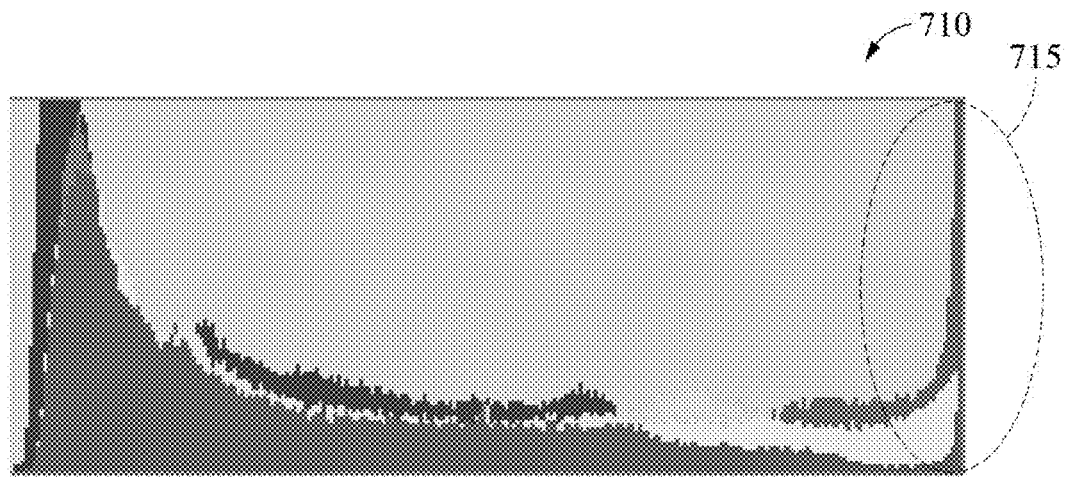
FIGS. 7A and 7B illustrate an example of a result of restoring a pixel value of a saturated region.
Figure 7B:
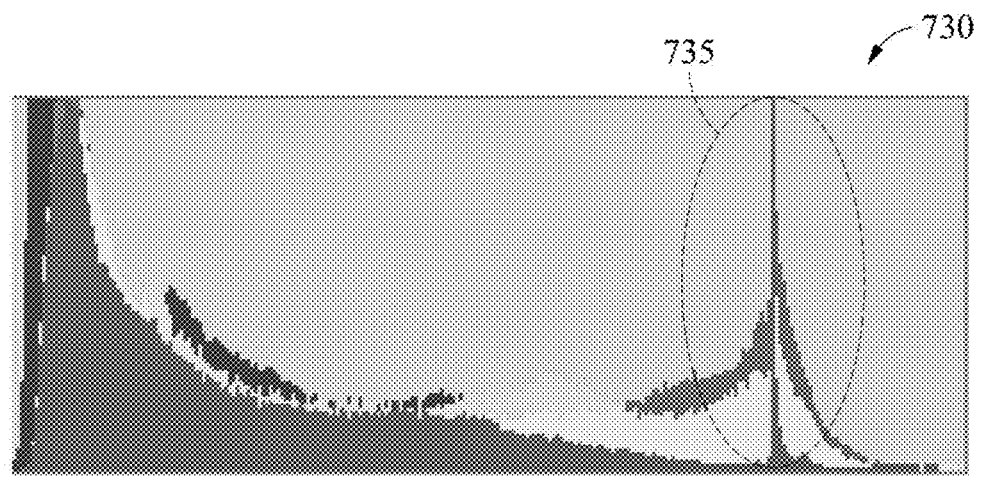

FIGS. 7A and 7B illustrate an example of a result of restoring a pixel value of a saturated region. Referring to FIGS. 7A and 7B, a graph 710 showing a DR of an input image and a graph 730 showing a DR of an image in which a saturated region of the input image is restored are illustrated.

It is verified that a saturated region 715 in the graph 710 moves to a region 735 in the graph 730, and thus a DR is widened. Here, the widened DR as in the graph 730 is compressed again through the DRC process which will be described below with reference to FIGS. 8A and 8B.

Figure 8A:
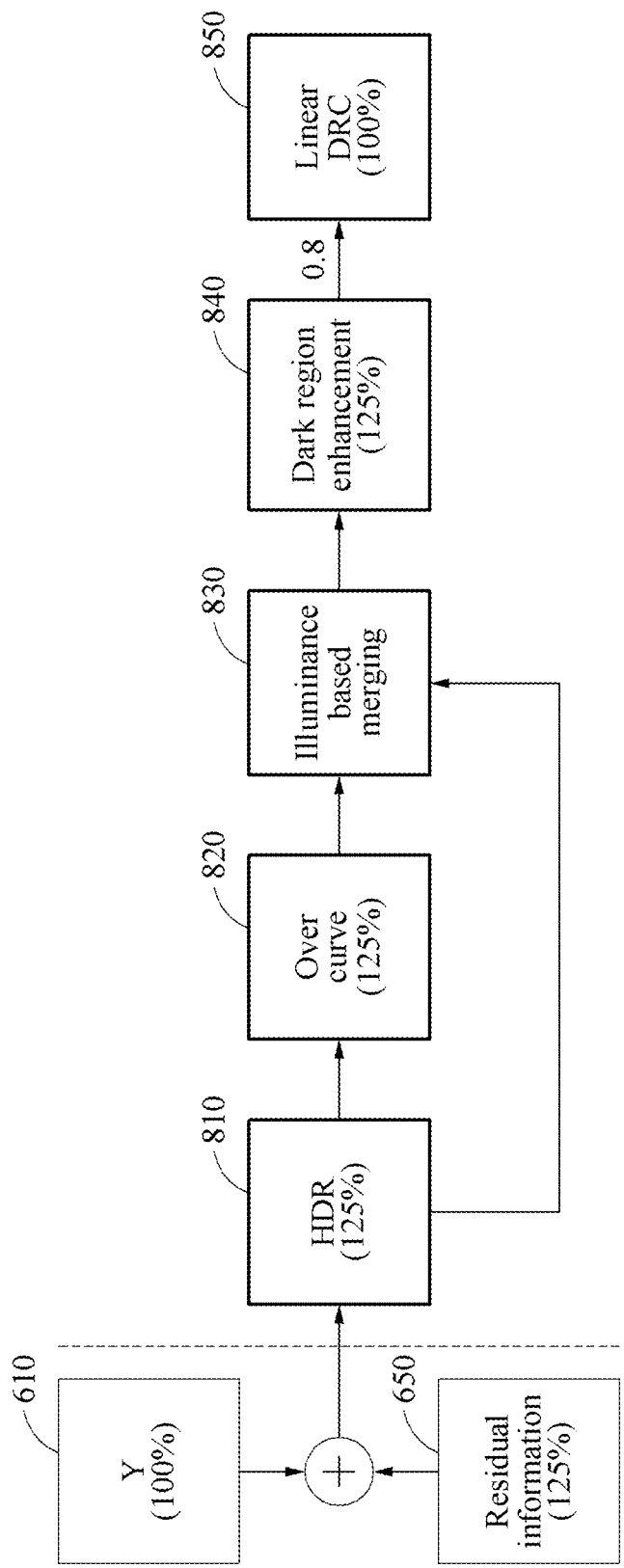
FIGS. 8A and 8B illustrate an example of enhancing a dark region.
Figure 8B:
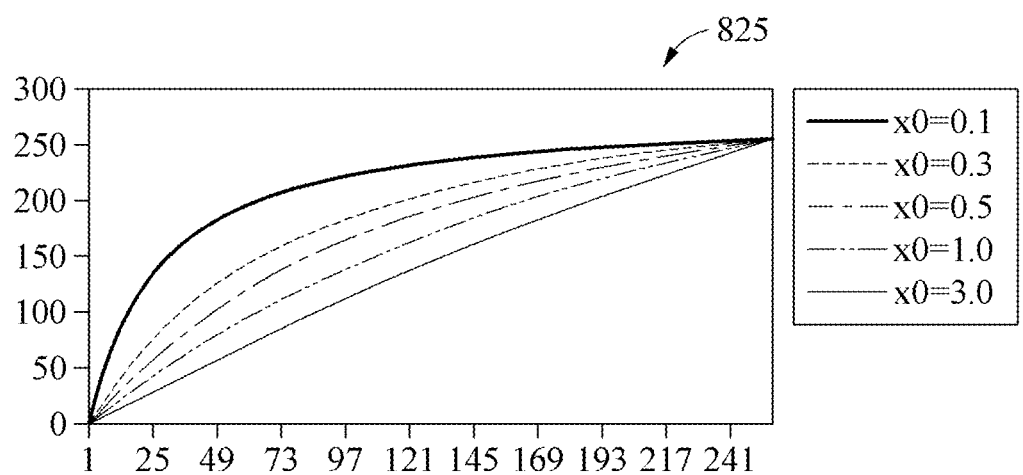

FIGS. 8A and 8B illustrate an example of enhancing a dark region. Referring to FIGS. 8A and 8B, an example in which an image processing apparatus enhances a dark region of a saturated region-restored image is illustrated.

The image processing apparatus receives a saturated region-restored image, in operation 810. In an example, the saturated region-restored image is a restored 10-bit (125%) image when it is assumed an input image is an 8-bit image (100%), and corresponds to the image 660 described above.

Thus, the image processing apparatus enables a result image to have a DR identical to that of the input image by performing a DRC process to readjust the DR of the image to the original 8 bits. The image processing apparatus enhances a dark region of the image while performing the DRC process. In an example, by enhancing the dark region of the image, it is possible to clearly recognize objects which exist in the dark region and are not identified well, for example, shadowed portions in a driving image.

In operation 820, the image processing apparatus enhances a dark region of the saturated region-restored image using an over curve which may be similar to a gamma curve. In FIG. 8B, a graph 825 shows an over curve used to enhance a dark region of an image. In the graph 825, a X axis indicates an input pixel value, and a Y axis indicates an output pixel value.

In an example, the over curve is expressed by Equation 2.

$$f(x) = \frac{x}{x + x_0}(\max(x) + x_0) \qquad \text{[Equation 2]}$$

In Equation 2, x denotes the input pixel value, and $x_0$ denotes a parameter to adjust an enhancement level of the dark region. Further, max(x) denotes a maximum value among values of pixels in the image.

The image processing apparatus adjusts the enhancement level of the dark region of the saturated region-restored image based on various parameters, for example, $x_0$=0.1, 0.3, 0.5, 1.0, and 3.0, as represented in the graph 825. In this example, an image in which the dark region is enhanced using the over curve is still a 10-bit (125%) image.

The image processing apparatus enhances the dark region while maintaining a contrast of the image in view of neighboring pixels. When the dark region of the image is enhanced using the over curve in operation 820, a contrast of a bright region in the image decreases. The image processing apparatus resolves the decrease in the contrast of the bright region by calculating an increment of each pixel of the image passing through the over curve relative to the input image. The image processing apparatus calculates the increment of the pixel relative to a neighboring pixel value using an illuminance component, for example, a first illuminance component, of the image, and maintains a local contrast of the corresponding image while enhancing the dark region of the image by adjusting the increment of the pixel using the same.

The image processing apparatus calculates an increment of each of pixel values of a dark-region enhanced image relative to pixel values of the saturated region-restored image received in operation 810, in operation 830. The image processing apparatus enhances the dark region by adjusting the increment of the pixel relative to a neighboring pixel based on the first illuminance component of the input image, in operation 840. In this example, a local contrast factor (LCF) which is a value to adjust the contrast of the input image based on a value of the neighboring pixel is expressed by Equation 3.

$$LCF(x, y) = \left(\frac{I(x, y)}{I_m}\right)^{\gamma} I_M R(x, y) \qquad \text{[Equation 3]}$$

$$R(x, y) = \frac{f(x, y)}{(1 - w)I(x, y) + wl(x, y)}$$

In Equation 3, I(x,y) denotes a value of each pixel of the input image, and $I_M$ denotes a maximum pixel value of a neighboring region. f(x,y) denotes each pixel of which a value increases relative to a whole region, and l(x,y) denotes an illuminance value of each pixel.

A dark region-enhanced image acquired through operation 840 is a 10-bit (125%) image.

In operation 850, the image processing apparatus linearly performs a DRC with respect to the dark region-enhanced image. Through the DRC of operation 850, the image is restored to an 8-bit (100%) image having a DR identical to that of the input image.

Figure 9:
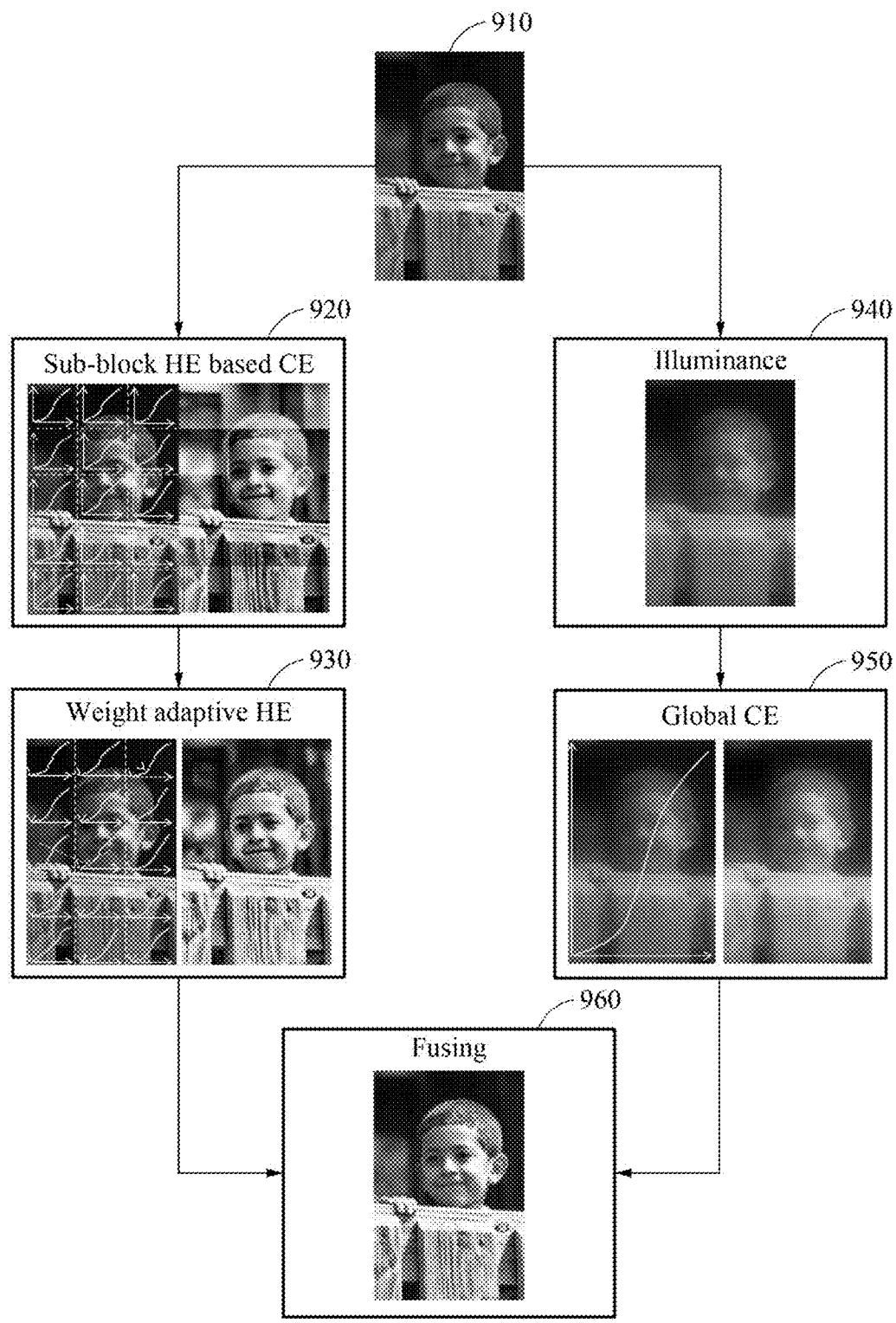
FIG. 9 illustrates an example of adjusting a contrast of an image.

FIG. 9 illustrates an example of adjusting a contrast of an image. Referring to FIG. 9, an example in which an image processing apparatus adjusts a contrast of an image is illustrated.

When the DR-adjusted image acquired through the process described with reference to FIGS. 8A and 8B is received in operation 910, an image processing apparatus adjusts an overall contrast of the received image.

The image processing apparatus adjusts a local contrast of the dark region-enhanced image using an HE based local curve.

In an example, the image processing apparatus increases the local contrast of the received image by applying an HE based contrast enhancement (CE) method. In operation 920, the image processing apparatus segments the received image into multiple blocks, and estimates an HE based local curve for each of the blocks. In operation 930, the image processing apparatus adjusts a contrast for each of the blocks by adaptively adjusting the local curve based on a sum of weights corresponding to distances from pixels for each of the blocks to the local curve.

To enhance the local contrast, a single image is segmented into multiple blocks, and an HE is performed thereon. In this example, other blocks are not considered at an edge between blocks, and thus a "blocking artifact" occurs. The blocking artifact is an image quality deterioration occurring due to an error in a block-based quantization process for image coding, and is construed as, for example, a deterioration in image quality occurring due to a discontinuity appearing at an edge of neighboring blocks when the blocks of the single image are processed independently.

To prevent the occurrence of the blocking artifact, a local curve is generated based on an HE of each block. A new curve is generated based on a sum of weights corresponding to distances from neighboring blocks of each pixel to the local curve. In an image processed as described above, the blocking artifact decreases, however, a luminance is inverted.

By readjusting the local curve based on a second illuminance component extracted from the dark region-enhanced image acquired through the process of FIGS. 8A and 8B, a global contrast is adjusted, and the luminance inversion is resolved.

In operation 940, the image processing apparatus extracts an illuminance component, for example, the second illuminance component, from the dark region-enhanced image acquired through the process of FIGS. 8A and 81. In this example, the second illuminance component is a value having a low-frequency component, and corresponds to an average value of luminances of neighboring regions.

In operations 950 and 960, the image processing apparatus readjusts the local curve using the second illuminance component corresponding to the average value of the luminances of the neighboring regions. The image processing apparatus adjusts the global contrast through the process described above, thereby obtaining a result of an local HE while maintaining a result of a global HE with respect to an overall brightness of the image.

The image processing apparatus enhances information of a driving image acquired using a single sensor through the examples described above. In an example, "enhancing information" indicates restoring a saturated region or a saturated pixel, enhancing a dark region, and enhancing an overall contrast of an image. The image processing apparatus enhances the recognition performance of driving images through the process described above.

FIG. 10 illustrates an example of an image processing apparatus 1000. Referring to FIG. 10, an image processing apparatus 1000 includes a processor 1010, the communication interface 1030, a memory 1050, and a display 1070. The processor 1010, the communication interface 1030, and the memory 1050 communicate with each other through a communication bus 1005.

The processor 1010 refers to a data processing device configured as hardware with a circuitry in a physical structure to execute desired operations. For example, the desired operations may include codes or instructions included in a program. For example, the data processing device configured as hardware may include a microprocessor, a central processing unit (CPU), a processor core, a multicore processor, a reconfigurable processor, a multiprocessor, an application-specific integrated circuit (ASIC), a field programmable gate array (FPGA), a graphics processor unit (GPU), or any other type of multi- or single-processor configuration. In an example, the processor executes functions and instructions in the image processing apparatus 1000. For example, the processor 1010 may process instructions stored in the memory 1050. Further details regarding the process 1010 is provided below.

The processor 1010 restores a saturated region in which a pixel in an input image has a first reference value, based on a first illuminance component of the input image. For example, the processor 1010 restores the saturated region by applying an HDR technique based on a pixel value of a subpixel having a lowest sensitivity among R, G, and B subpixels of each of pixels included in the input image and the first illuminance component of the input image. Further, the processor 1010 obtains a luminance component of the input image. The processor 1010 restores a luminance component of the saturated region by assuming a linear distribution of the input image based on the luminance component and the first illuminance component of the subpixel having the lowest sensitivity. The processor 1010 obtains residual information from an image of the subpixel having the lowest sensitivity and the restored luminance component using a guided filter. The processor 1010 restores the saturated region by applying the residual information to the luminance component.

The processor 1010 enhances a dark region in which a value of a pixel in the input image is less than a second reference value, based on the restored saturated region and the first illuminance component. The processor 1010 enhances the dark region based on an over curve. The processor 1010 calculates an increment of each of pixel values of a dark region-enhanced image relative to pixel values of the input image. The processor 1010 enhances the dark region by adjusting the increment of the pixel relative to a neighboring pixel based on the first illuminance component of the input image. The processor 1010 performs a DRC with respect to the dark region-enhanced image.

The communication interface 1030 acquires the input image. In an example, the communication interface 1030 includes one or more sensors to acquire the input image. In another example, the communication interface acquires the input image from an external sensing device. In an example, the communication interface 1030 outputs the dark region-enhanced image to the display 1070.

In an example, the display 1070 receives an input from a user or provides an output. The display 1070 is a physical structure that includes one or more hardware components that provide the ability to render a user interface, render a display, and/or receive user input. However, the display 1070 is not limited to the example described above, and any other displays, such as, for example, head-up display (HUD), augmented reality head-up display (AR 3D HUD), computer monitor, and eye glass display (EGD) that are operatively connected to the image processing apparatus 1000 may be used without departing from the spirit and scope of the illustrative examples described.

The memory 1050 stores the input image acquired through the communication interface 1030. The memory 1050 stores the saturated region-enhanced image acquired by the processor 1010. Further, the memory 1050 stores the dark region-enhanced image acquired by the processor 1010.

Further, the processor 1010 performs the at least one method described with reference to FIGS. 1 through 9 or an algorithm corresponding to the at least one method. The processor 1010 is a hardware-implemented data processing device having a circuit with a physical structure to perform desired operations. For example, the desired operations include codes or instructions included in a program. The hardware-implemented data processing device may include a microprocessor, a central processing unit (CPU), a processor core, a multicore processor, a reconfigurable processor, a multiprocessor, an application-specific integrated circuit (ASIC), a field programmable gate array (FPGA), a graphics processor unit (GPU), or any other type of multi- or single-processor configuration.

The processor 1010 executes the program, and controls the image processing apparatus 1000. The program codes executed by the processor 1010 are stored in the memory 1050.

The memory 1050 stores a variety of information generated during the processing process of the processor 1010 described above. In addition, the memory 1050 stores a variety of data and programs. The memory 1050 includes a volatile memory or a non-volatile memory. In an example, the memory 1050 may include a non-transitory computer-readable medium, for example, a high-speed random-access memory (RAM), and/or a nonvolatile computer-readable storage medium, for example, at least one disk storage device, flash memory device, and other nonvolatile solid-state memory devices. The memory 1050 includes a large capacity storage medium such as a hard disk to store the variety of data. Further details regarding the memory 1050 is provided below.

The image processing apparatuse 300, CDF obtainer 310, first illuminance component obtainer 320, saturated pixel restorer 330, dark spot enhancer 350, second illuminance component obtainer 360, contrast enhancer 370 and image processing apparatus 1000, and other apparatuses, units, modules, devices, and other components described herein with respect to FIGS. 1-10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the image processing method. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image processing method, comprising:
   acquiring an image;
   obtaining a first illuminance component of the image from an offset-compensated image;
   restoring a saturated region in which a first pixel in the image has a first reference value based on the first illuminance component of the image by using a pixel value of a subpixel having a lowest sensitivity among red (R), green (G), and blue (B) subpixels of each pixel included in the saturated region;
   calculating an increment of each pixel value of a dark region-enriched image relative to pixel values of the image by using an over curve, wherein the increment of each pixel value is adjusted using the over curve;
   enhancing a dark region in which a value of a second pixel in the image is less than a second reference value based on the restored saturated region and the first illuminance component, by calculating a local contrast factor based on an increment of a corresponding pixel and an increment of a surrounding pixel, and adjusting the increment of the corresponding pixel based on the local contrast factor; and
   outputting a dark region-enhanced image.

2. The image processing method of claim 1, wherein the restoring of the saturated region based on the subpixel having the lowest sensitivity and the first illuminance component of the image comprises:
   obtaining a luminance component of the image;
   restoring a luminance component of the saturated region by assuming a linear distribution of the image based on a first illuminance component of the subpixel having the lowest sensitivity and the luminance component;
   obtaining residual information from an image of the subpixel having the lowest sensitivity and the restored luminance component using a guided filter; and
   restoring the saturated region by applying the residual information to the luminance component.

3. The image processing method of claim 2, wherein the restoring of the luminance component of the saturated region comprises restoring the luminance component of the saturated region based on the subpixel having the lowest sensitivity and the first illuminance component of the image, in response to the subpixel having the lowest sensitivity being unsaturated.

4. The image processing method of claim 1, wherein the enhancing comprises:
   enhancing the dark region based on the over curve; and
   performing a dynamic range compression (DRC) with respect to a dark region-enhanced image.

5. The image processing method of claim 4, wherein the enhancing of the dark region based on the over curve comprises:
   enriching the dark region using the over curve to generate the dark region-enriched image.

6. The image processing method of claim 1, further comprising:
   adjusting a contrast of the dark region-enhanced image,
   wherein the outputting of the dark region-enhanced image comprises outputting a contrast-adjusted image.

7. The image processing method of claim 6, wherein the adjusting of the contrast comprises:
   adjusting a local contrast of the dark region-enhanced image using a histogram equalization (HE) based local curve; and
   adjusting a global contrast of the dark region-enhanced image by readjusting the local curve based on a second illuminance component extracted from the dark region-enhanced image.

8. The image processing method of claim 7, wherein the adjusting of the local contrast comprises:

segmenting the dark region-enhanced image into blocks;
estimating the HE based local curve for each of the blocks; and
adjusting a contrast for each of the blocks by adjusting the local curve based on a sum of weights corresponding to distances from pixels for each of the blocks to the local curve.

9. The image processing method of claim 7, wherein the adjusting of the global contrast comprises:
extracting the second illuminance component from the dark region-enhanced image; and
adjusting the global contrast by readjusting the local curve based on the second illuminance component.

10. The image processing method of claim 1, further comprising:
compensating for an offset corresponding to a pixel value less than the second reference value in the image based on a cumulative distribution function (CDF).

11. The image processing method of claim 10, wherein the compensating comprises:
setting pixel values of a dark region in which a pixel is estimated to have a value less than the second reference value among values of the pixels included in the image, as the offset and removing the offset; and
estimating the CDF by linearly stretching pixels remaining after the offset is removed from the image.

12. The image processing method of claim 10, wherein the obtaining comprises estimating the first illuminance component of the image by passing the offset-compensated image separately through a cross bilateral filter (CBF) based first local filter and a just noticeable difference (JND) based second local filter.

13. The image processing method of claim 12, wherein the obtaining comprises:
generating a global blur image corresponding to the image by passing the offset-compensated image through the CBF based first local filter;
generating a local blur image corresponding to an edge region of the image by passing the offset-compensated image through the JND based second local filter; and
obtaining the first illuminance component by blending the global blur image and the local blur image based on a weight.

14. A non-transitory computer-readable storage medium storing instructions that, when executed by a processor, cause the processor to perform the image processing method of claim 1.

15. An image processing apparatus, comprising: one or more processors configured to:
obtain a first illuminance component of an image from an offset-compensated image;
restore a saturated region n which a first pixel in the image has a first reference value based on the first illuminance component of the image by using a pixel value of a sub pixel having a lowest sensitivity among red (R), green (G), and blue (B) subpixels of each pixel included in the saturated region;
calculate an increment of each pixel value of a dark region-enriched image relative to pixel values of the image by using an over curve, wherein the increment of each pixel value is adjusted using the over curve;
enhance a dark region in which a value of a second pixel in the image is less than a second reference value based on the restored saturated region and the first illuminance component, by calculating a local contrast factor based on an increment of a corresponding pixel and an increment of a surrounding pixel, and adjusting the increment of the corresponding pixel based on the local contrast factor;
and output a dark region-enhanced image.

16. The image processing apparatus of claim 15, wherein the one or more processors are further configured to:
obtain a luminance component of the image,
restore a luminance component of the saturated region by assuming a linear distribution of the image based on a first illuminance component of the subpixel having the lowest sensitivity and the luminance component,
obtain residual information from an image of the subpixel having the lowest sensitivity and the restored luminance component using a guided filter, and
restore the saturated region by applying the residual information to the luminance component.

17. The image processing apparatus of claim 15, wherein the one or more processors are further configured to:
enrich the dark region using the over curve to generate the dark region-enriched image; and
perform a dynamic range compression (DRC) with respect to the dark region-enhanced image.

* * * * *